(No Model.) 2 Sheets—Sheet 2.
E. EHLIN.
MACHINE FOR MANUFACTURING MOUTH PIECES FOR CIGARS.
No. 296,683. Patented Apr. 8, 1884.
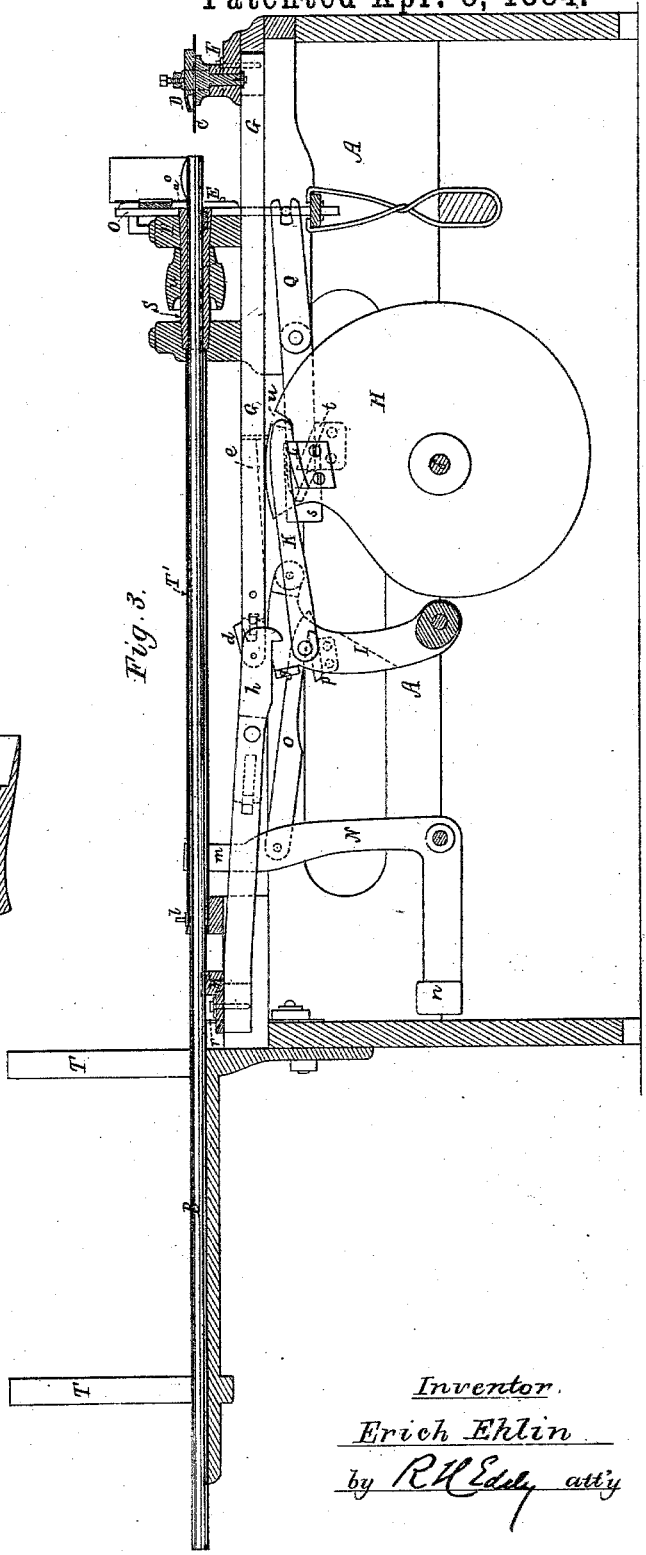
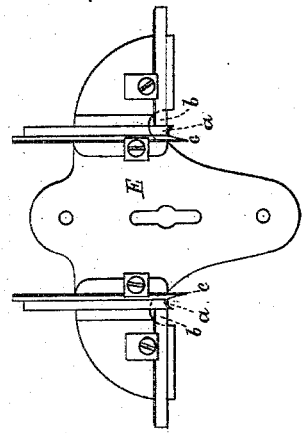
Witnesses
S. N. Piper
E. A. Pratt
Inventor
Erich Ehlin
by R. H. Eddy att'y

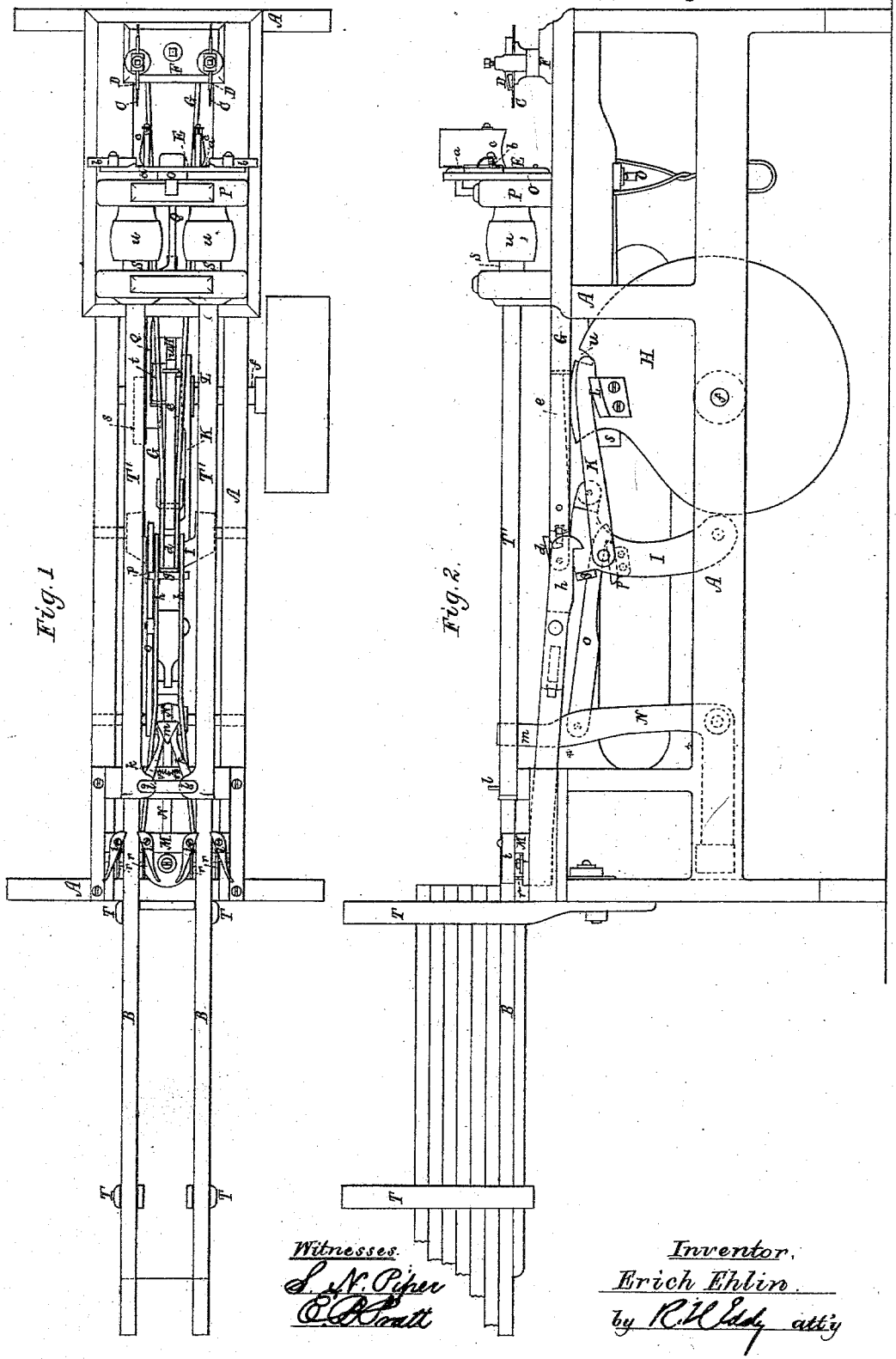

United States Patent Office.

ERICH EHLIN, OF SAN FRANCISCO, CALIFORNIA.

MACHINE FOR MANUFACTURING MOUTH-PIECES FOR CIGARS.

SPECIFICATION forming part of Letters Patent No. 296,683, dated April 8, 1884.

Application filed November 9, 1883. (No model.)

*To all whom it may concern:*

Be it known that I, ERICH EHLIN, of San Francisco, in the county of San Francisco, of the State of California, have invented a new and useful Improvement in Machinery for Manufacturing Mouth-Pieces for Cigars; and I do hereby declare the same to be described in the following specification and represented in the accompanying drawings, of which—

Figure 1 is a top view, Fig. 2 a side elevation, and Fig. 3 a longitudinal section, of a machine embodying my invention, the nature of which is defined in the claims hereinafter presented. Fig. 4 is a front view of the vertically-reciprocating cutter-carriage. Fig. 5 is a side view, and Fig. 6 a longitudinal section, of one of the articles or cigar mouth-pieces made by the machine.

The said machine is automatic in its action, and, as represented, is intended to form from one or two long cylindrical sticks a series of such mouth-pieces, each of which is tubular, and shaped substantially as shown in Figs. 5 and 6—that is to say, it has a conical mouth, $a'$, to receive the end of a cigar, which is to be secured therein by cement or other proper means, such mouth-piece externally being concave around it, as shown at $b'$, and rounded at its rear end, as shown at $c'$. The mouth-piece is to prevent contracting of the cigar by the lips or teeth of a smoker, it being intended that in manufacturing cigars for sale each shall be provided with such a mouth-piece.

In the drawings, A denotes the frame for supporting the main operative parts of the machine. The two sticks shown at B B go through tubular mandrels S S, adapted to receive them and guide them forward rectilinearly to proper positions for them to be operated on by the boring and reaming tools C D and the two sets of cutters $a\,b\,c$ of the vertically-movable cutter-carrier E. Each auger or boring-tool C and each reaming-tool D, arranged as shown, is sustained by a movable carriage, F, adapted to the frame A, to be slid rectilinearly thereon and longitudinally thereof. A furcated arm, G, extends back from the carriage F, and carries two catch-pawls, $d$ and $e$, formed and arranged in and pivoted to it, as represented. Underneath the longer pawl, $e$, is a rotary cam, H, fixed upon a driving-shaft, $f$, and in rear of the said cam is a vibratory arm, I, which at its upper end rests on the periphery of the said cam. Pivoted to the said arm is a hooked pawl, K, which rests upon and operates with an ear, L, extending from one side of the cam H. The vibratory arm I has to its upper part a catch projection, $g$, for a hook, $h$, to engage with, such hook being arranged as shown, and extended from a movable carriage, M, that supports and has pivoted to it two sets of jawed levers, $i\,i$, formed and arranged as shown, such sets having in advance of them another set, $k\,k$, formed and arranged as represented, and supported by stationary fulcra $l$. There is between the tails of the set $k$ a wedge, $m$, fixed on the top of the upper arm of a knee-lever, N. A hooked pawl, $o$, is pivoted and extends to and upon an ear, $p$, extending from the vibratory arm I.

In rear of each set of jawed levers $i\,i$, and supported by the frame A, are sets of springs $r$, for closing the jaw-levers upon the stick, in order to enable them to move it forward during an advance of their carriage M.

T' T' are tubes for supporting the sticks and guiding them to the mandrels. These tubes are useful auxiliaries to the machine.

The cutter-carrier E is fixed to a vertically-reciprocating slide, O, properly adapted to a guide-standard, P. A lever, Q, fulcrumed on the frame A, and arranged as shown, has its forward arm pivoted to the slide O, the rear arm of such lever having upon it a weight, $s$, sufficiently heavy to overbalance the slide O and the cutter-carrier E and the cutters thereof. The rear arm of the lever Q is over an ear, $t$, extending from the cam H.

Each of the mandrels S has upon it a pulley, $u$, for revolving it by a belt, and it should be provided with a small projection or spline, or suitable means of enabling it to grasp or hold the stick, so as to revolve it when such mandrel may be revolved, such means admitting of the stick being advanced in it as occasion may require.

In rear of the frame A are suitable standards, T, for supporting the sticks in tiers one over another, the same being so that as each stick may be advanced sufficiently for its set of jawed levers to pass back beyond it another or the next stick above in the tier or pile shall fall between and be caught by the jaws, so as when they may be next advanced it shall be moved forward by them and against the other stick, so as to cause its further advance until it may be entirely cut up or reduced to cigar mouth-pieces.

In the operation of this machine, the ear L, revolving with the cam H, will engage with the hooked pawl K and draw forward the vibratory arm I until such pawl may become disengaged from the ear, which it will be by the action of the ear against it. In moving forward, the vibratory arm, by means of the catch projection $g$ and the hook $h$, will advance the carriage M, and thereby cause the two sticks to be moved forward the requisite distance through and beyond the mandrels. Next, the cam will force backward the vibratory arm I, which, meeting the catch-pawl $d$, will cause the boring and reaming tool carriage F to be retracted toward the sticks, and the boring and reaming tools to enter and bore and ream them, the reaming of them being to form in them the cigar-receiving mouths of the cigar mouth-pieces. The cam continuing to revolve, the hooked pawl $e$ will catch into a notch, $u$, in the periphery of the cam, in consequence of which the cam will cause the boring and reaming tool carriage to be advanced so as to convey the boring and reaming tools out of the sticks. On such having occurred, the ear $t$ will be carried by the cam into engagement with the lever Q, so as to move it and cause the slide O and the cutter-carrier E to be depressed in a manner to force the cutters $a\ b\ c$ down to the sticks and cause them to properly act thereon. The cutter $c$ forms the hollow in the body of the mouth-piece, the cutter $b$ rounds or finishes the rear end of the said mouth-piece, and the cutter $a$ separates the mouth-piece from the stick. In advancing, the vibratory arm I at the proper time carries the ear $p$ into engagement with the hooked pawl $o$, whereby the knee-lever N will be moved, so as to carry the wedge $m$ out of engagement with the tails of the stick-clamping levers $k\ k$, so as to allow them, by means of springs $v$, applied to them, to move up to and hold the sticks from being moved backward while the jawed levers, for advancing them, are being retracted. Previous to each advance of the sticks the ear $p$, by the advance of the arm I, will force upward the hooked pawl $o$ and become disengaged therefrom, so as to allow the weight $n$ to move the lever N, so as to force the wedge between the tails of the clamping-levers $k\ k$ and move the said levers away from the sticks, in order to allow of their being advanced by the jawed levers $i\ i$.

I claim—

1. In a machine for the manufacture of mouth-pieces, provided with the supporting-mandrels, the carriage E, carrying the cutters $a\ b\ c$, for hollowing, rounding, and separating the mouth-pieces, in combination with the slide O, which is fixed to the carriage, the lever Q, connected with the slide at one end and having the weight $s$ at the other, and the cam H, provided with the ear $t$, the latter being under the rear end of the lever Q and to engage therewith, as set forth.

2. In a machine for forming mouth-pieces, the combination of the carriage M, spring-acted advancing-jaws $i$, located on said carriage, retaining-jaws $k$ in front of said carriage, lever N, provided with the separating-wedge $m$, which enters between the free ends of jaws $k$, and means, substantially as described, for operating said lever N, as set forth.

ERICH EHLIN.

Witnesses:
R. H. EDDY,
E. B. PRATT.